(12) United States Patent
Nakamura

(10) Patent No.: US 8,216,353 B2
(45) Date of Patent: *Jul. 10, 2012

(54) INK-JET INK AND INK-JET RECORDING METHOD

(75) Inventor: Masaki Nakamura, Akiruno (JP)

(73) Assignee: Konica Minolta Holdings, Inc., Tokyo (JP)

( * ) Notice: Subject to any disclaimer, the term of this patent is extended or adjusted under 35 U.S.C. 154(b) by 1000 days.

This patent is subject to a terminal disclaimer.

(21) Appl. No.: 12/077,229

(22) Filed: Mar. 18, 2008

(65) Prior Publication Data

US 2008/0241424 A1 Oct. 2, 2008

(30) Foreign Application Priority Data

Mar. 29, 2007 (JP) ................. 2007-087236

(51) Int. Cl.
*B05D 3/06* (2006.01)
*C09D 11/02* (2006.01)

(52) U.S. Cl. ............. 106/31.13; 106/31.6; 427/595; 522/68; 347/100; 523/160

(58) Field of Classification Search .......... 106/31.13, 106/31.6; 427/595; 522/68; 347/100; 523/160
See application file for complete search history.

(56) References Cited

U.S. PATENT DOCUMENTS

| | | | | |
|---|---|---|---|---|
| 3,715,293 A * | 2/1973 | Sandner et al. | ................. | 522/44 |
| 4,228,438 A | 10/1980 | Vazirani | | |
| 4,390,369 A | 6/1983 | Merritt et al. | | |
| 4,400,519 A * | 8/1983 | Hagiwara et al. | ............. | 548/461 |
| 4,480,094 A * | 10/1984 | Hagiwara et al. | ............. | 544/222 |
| 4,484,948 A | 11/1984 | Merritt et al. | | |
| 6,500,875 B2 | 12/2002 | Noguchi | | |
| 8,052,270 B2 * | 11/2011 | Nakamura et al. | ............ | 347/100 |
| 2004/0116553 A1 * | 6/2004 | Nakamura et al. | ............ | 523/160 |
| 2005/0287476 A1 | 12/2005 | Ishikawa et al. | | |
| 2005/0288384 A1 | 12/2005 | Kanke et al. | | |
| 2006/0004116 A1 | 1/2006 | Kishi et al. | | |
| 2006/0189715 A1 | 8/2006 | Ishibashi et al. | | |
| 2007/0015843 A1 | 1/2007 | Chang et al. | | |
| 2007/0032571 A1 * | 2/2007 | Furuno et al. | ................. | 523/160 |
| 2007/0112094 A1 | 5/2007 | Noutary | | |
| 2007/0240609 A1 * | 10/2007 | Husler et al. | ............... | 106/31.97 |
| 2008/0239043 A1 | 10/2008 | Nakazawa | | |
| 2009/0169765 A1 * | 7/2009 | Nakamura et al. | ............ | 427/511 |

FOREIGN PATENT DOCUMENTS

| | | |
|---|---|---|
| EP | 1 188 806 A2 | 3/2002 |
| EP | 1 788 044 A1 | 5/2007 |
| EP | 1 792 744 A1 | 6/2007 |
| EP | 1 975 214 A1 | 10/2008 |
| JP | 05-064667 B2 | 9/1993 |
| JP | 05-310635 A | 11/1993 |
| JP | 06-228218 A | 8/1994 |
| JP | 07-224241 A | 8/1995 |
| JP | 2000-186242 A | 7/2000 |
| JP | 2000-273110 A | 10/2000 |
| JP | 2001-525887 A | 12/2001 |
| JP | 2003-192712 A | 7/2003 |
| JP | 2005-307199 A | 11/2005 |
| WO | WO 97/49664 A1 | 12/1997 |
| WO | WO 98/53369 A1 | 11/1998 |
| WO | WO 2005/012448 A2 | 2/2005 |
| WO | WO 2006/080139 A1 | 8/2006 |

OTHER PUBLICATIONS

Database WPI Week 199351, Derwent Publications Ltd., London, GB; AN 1993-410807 XP002483648.

* cited by examiner

*Primary Examiner* — Mark Eashoo
*Assistant Examiner* — Michael A Salvitti
(74) *Attorney, Agent, or Firm* — Holtz, Holtz, Goodman & Chick, PC

(57) ABSTRACT

An ink-jet ink comprising at least water, a water-soluble solvent, a radically polymerizable compound, and a photoinitiator, wherein the photoinitiator is a benzyl ketal compound incorporating a pendent water-soluble group via an oxygen atom or a sulfur atom.

9 Claims, No Drawings

INK-JET INK AND INK-JET RECORDING METHOD

This application is based on Japanese Patent Application No. 2007-087236 filed on Mar. 29, 2007, in Japanese Patent Office, the entire content of which is hereby incorporated by reference.

FIELD OF THE INVENTION

The present invention relates to an actinic radiation curable ink-jet ink and a recording method using the same, which excel in feathering in plain paper recording and are suitable for recording or color bleeding on a medium featuring low or no ink absorptivity.

BACKGROUND OF THE INVENTION

An ink-jet recording method is a relatively simple apparatus and is capable of recording highly detailed images, leading to the rapid development in various fields. Further, an ink-jet recording method is used in a wide variety of applications, and a suitable recording medium or ink for each application is employed. Specifically, recording speed has been significantly increased, and then printers with performance capable of meeting quick printing applications have been developed in recent years.

However, in order for an ink-jet printer to exert its optimal performance, special ink-jet paper featuring appropriate ink absorptivity is critical.

When recording on coated paper or art paper with limited ink absorptivity or on a plastic film of no ink absorptivity, produced are problems such as bleeding, resulting in color mixing due to mixing of different liquid color inks on the recording medium, which has been a continuing problem in diversifying recording media in the ink-jet printing field.

To overcome the above problems, a hot-melt ink-jet recording method has been proposed, wherein a hot-melt ink composition containing wax, which is solid at room temperature, is used as a basic material; the composition is liquefied by heat, ejected via an appropriate form of energy, and deposited on a recording medium to form recorded dots which are cool-solidified during the deposition. Since this ink is solid at room temperature, no smudging during handling or clogging of the nozzle occurs since there is substantially no evaporation of the ink while in its melted state.

Further, an ink composition has been proposed which exhibits low color bleeding due to rapid solidification after deposition and provides excellent printing quality regardless of paper quality (for example, refer to Patent Documents 1 and 2).

However, since images recorded via these methods are composed of soft wax-like ink dots, problems of quality degradation due to dot embossment and of deficient abrasion resistance have been noted.

In contrast, an ink-jet UV ink has been disclosed, wherein an ink employing a colorant and a polymerizable material is ejected and cured via UV light irradiation (for example, refer to Patent Document 3). In this case, since all the ink is cured, a image portion produced is thick, resulting in a major difference in glossiness, compared to a non-image portion, which produces an unnatural image, whereby no natural image can be produced.

To eliminate glossiness difference, a solvent-based UV ink has been proposed, wherein a pigment and a polymerizable material are dissolved in an organic solvent (for example, refer to Patent Document 4). In this case, although the thickness of the image portion can be controlled and the problem of glossiness can also be improved, in contrast, there is an essential disadvantage in such that a poor working-environment, due to odor resulting from the organic solvent, is created. Therefore, the solvent-based UV ink has not been put into practice.

To improve the glossiness of the image portion and also to overcome the odor problem, there have been proposed water-based UV light curable inks employing a water-based UV curable monomer (for example, refer to Patent Document 5), and a water-soluble crosslinkable polymer (for example, refer to Patent Document 6). Although the glossiness of the image portion is improved and the odor problem is overcome using these inks, sufficient image quality is yet be realized in overcoming the specific problem of the UV ink.

The above specific problem of the UV ink is that, since a large amount of a colorant is contained in the ink, much of the UV light irradiated from a UV light source is absorbed by the colorant, resulting in requiring a large amount of light for curing. It has been widely demanded that, since the amount of light required for curing yellow ink, magenta ink, cyan ink, and black ink is commonly increased in the stated order, the photocuring sensitivity of the black ink is specifically enhanced. As a method of enhancing the photocuring sensitivity, it is known that sensitizers are added or longer-wavelength initiators are used as the photoinitiator. However, most of these substances are oil-based and no water-soluble substances have been found practicable.

Proposed substances include an initiator prepared by introducing a hydroxyethoxy group into 2-hydroxy-2-methyl-1-phenylpropane-1-one or benzophenone, as described in Unexamined Japanese Patent Application Publication No. (hereinafter, referred to as JP-A) 6-228218, an alkylphenone derivative whose $\alpha$-position is substituted with a polyalkyleneoxide, as described in JP-A No. 2003-192712, a photopolymerization initiator which is a halomethyl-1,3,5-triazine anion, as described in JP-A No. 2001-525887, a water-soluble photoinitiator featuring a cycloalkanol structure, as described in JP-A No. 2000-273110, an ethylene oxide adduct of 2-hydroxy-2-methyl-1-phenylpropane-1-one, as described in JP-A No. 2000-186242, an acyl water-soluble-phosphine, as described in JP-A No. 2005-307199, and an ethylene oxide adduct of 2-hydroxy-2-methyl-1-phenylpropane-1-one, as described in U.S. Pat. No. 6,500,875.

However, there have been noted disadvantages in that only a small amount of these photoinitiators can be dissolved in water; or the number of moles (the number of molecules) of an initiator containable in the ink is reduced, since the introduction of a long polyethylene oxide group into an initiator for enhancing its solubility increases the molecular weight.

Further, a compound described in JP-A No. 2005-307199 has been proposed as a phosphine-based initiator, featuring an absorption sensitivity of a wavelength of up to 420 nm, which is considered to sufficiently cure even black ink. However, there are safety problems based on the Ames test, and since the initiator features an absorption sensitivity of a wavelength of up to 420 nm, then the feasibility of curing even under fluorescent lighting exists, whereby the initiator is not preferably used for the above water-based UV curable ink from the viewpoint of ink storage properties and working properties.

Patent Document 1: U.S. Pat. No. 4,390,369
Patent Document 2: U.S. Pat. No. 4,484,948
Patent Document 3: U.S. Pat. No. 4,228,438
Patent Document 4: Examined Japanese Patent Application Publication No. 5-64667

Patent Document 5: JP-A No. 7-224241
Patent Document 6: PCT International Application Publication of WO 06/80139

SUMMARY OF THE INVENTION

In view of the above problems, the present invention was completed. An object of the present invention is to provide an ink-jet ink that exhibits a high photocuring sensitivity, specifically exhibits a high photocuring sensitivity even to black ink, and is easily handled, as well as an recording method employing the ink-jet ink.

Means to Solved the Problems

The object of the present invention was achieved employing the following constitutions.

Item 1. An ink-jet ink comprising at least water, a water-soluble solvent, a radically polymerizable compound, and a photoinitiator, wherein the photoinitiator is a benzyl ketal compound incorporating a pendant water-soluble group via an oxygen atom or a sulfur atom.

Item 2. The ink-jet ink described in Item 1 above, wherein the radically polymerizable compound is an ethylenically unsaturated group-containing compound.

Item 3. The ink-jet ink, described in Item 2 above, wherein the photoinitiator is a compound represented by Formula (1) attached with a —X—Y group.

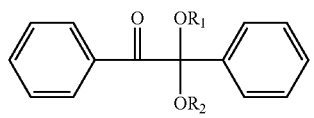

Formula (1)

In the formula, at least one of the two benzene rings incorporates at least one of the —X—Y groups, and may further incorporate a halogen atom, an alkyl group, an alkoxy group, or an alkylthio group; in the —X—Y group, X is O or S, and Y is an alkylene-Z (in which Z is a hydroxyl group, a carboxylate, a sulfonate, a phosphate, or a quaternary ammonium salt), an (alkylene-O)$_n$—H (where n=1-9), or an (alkylene-O)$_n$-sulfonate; and $R_1$ and $R_2$ are each a substituted or an unsubstituted alkyl group.

Item 4. The ink-jet ink described in Item 3, wherein the photoinitiator a compound represented by following Formula (A), (B), or (C).

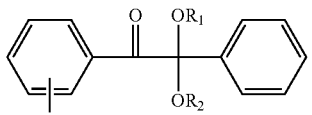

Formula (A)

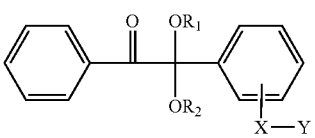

Formula (B)

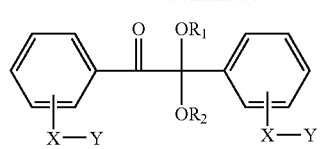

Formula (C)

In the formulas, the —X—Y group, $R_1$, and $R_2$ are identical to those in Formula (1), and the two benzene rings may further incorporate a halogen atom, an alkyl group, an alkoxy group, or an alkylthio group.

Item 5. The ink-jet ink described in any one of Items 1-4 above, wherein at least one of the ethylenically unsaturated group-containing compounds exhibits a molecular weight of at least 6,000.

Item 6. The ink-jet ink described in any one of Items 1-5 above, wherein at least one of the ethylenically unsaturated group-containing compounds is a polymeric compound, and a hydrophilic main chain of the polymeric compound incorporates a plurality of side chains exhibiting the ethylenically unsaturated groups.

Item 7. The ink-jet ink described in any one of Items 1-6 above, featuring pH of at least 5.5.

Item 8. The ink-jet ink described in any one of Items 1-7 above, wherein the ink-jet ink incorporates a pigment.

Item 9. The ink-jet ink described in Item 7 above, wherein the pigment is carbon black.

Item 10. An ink-jet recording method comprising the steps of:

(a) ejecting the ink-jet ink described in any one of Items 1-9 above onto a recording medium from an ink-jet recording head, and (b) irradiating ultraviolet rays onto the ejected ink-jet ink to form an image.

Effects of the Invention

An ink-jet ink and a recording method employing an improved photoinitiator of the present invention can be handled with no special care even under fluorescent lighting despite the high photocuring sensitivity of the ink, and also high quality images with no bleeding or beading can be realized.

MOST PREFERRED EMBODIMENT OF THE INVENTION

The most preferred embodiment to carry out the present invention will now be described that by no means limits the scope of the present invention.

The present invention relates to a photocurable ink-jet ink characterized by containing at least water, a water-soluble solvent, an ethylenically unsaturated group-containing compound, and a photoinitiator wherein a benzyl ketal compound has a pendant water-soluble group via an oxygen atom or a sulfur atom.

The photoinitiator, wherein a benzyl ketal compound has a pendant water-soluble group via an oxygen atom or a sulfur atom, is more specifically a photoinitiator having the above —X—Y group in Formula (1) described above, and is preferably an initiator selected from Formulas (A), (B), or (C).

In the —X—Y group, X is O or S, and Y is an alkylene-Z (Z is a hydroxyl group, a carboxylate, a sulfonate, or a phosphate), an (alkylene-O)$_n$H (n=1–9), or an (alkylene-O)$_n$-sulfonate. In the carboxylate, the sulfonate, or the phosphate, a sodium salt, a potassium salt, a lithium salt, and a quaternary ammonium salt are exemplified, and further, a carboxylate or a sulfonate is preferable for a salt.

The above alkylene group includes ethylene, propylene, and butylene, each of which may have a substitute such as a hydroxyl group. A preferable (alkylene-O)$_n$H (n=1-9) includes a 2,3-dihydroxypropyl group.

The reason is that performance of an ink-jet ink is enhanced when a large number of moles of an initiator is contained in the ink, but in cases of a larger molecular weight thereof, only a limited number of moles can be contained in the ink. Further, the introduction of a large amount of a soluble group into the initiator in order to enhance its solubility increases the molecular weight, whereby the number of moles of the initiator containable in the ink is reduced, resulting in a dilemma of the decrease in the photocuring sensitivity of the ink. For this reason, as a group of a small molecular weight to be used to efficiently enhance the solubility, the 2,3-dihydroxypropyl group can be cited.

The two benzene rings may further incorporate a halogen atom, an alkoxy group, or an alkylthio group, specifically including a fluorine atom, a chlorine atom, a bromine atom, a methyl group, an ethyl group, a propyl group, a butyl group, a hexyl group, a methoxy group, an ethoxy group, a propoxy group, a butoxy group, a methylthio group, an ethylthio group, a propylthio group, and a butylthio group.

$R_1$ and $R_2$ are each a substituted or an unsubstituted alkyl group. The unsubstituted alkyl group includes a methyl group, an ethyl group, a propyl group, and a butyl group, and the substituted alkyl group includes a hydroxyalkyl group (for example, a hydroxyethyl group and a hydroxypropyl group), a glycidyl group, and —$(CH_2CH_2O)_n$H (where n=1–3).

The —X—Y group, $R_1$, and $R_2$ in above Formulas (A), (B), and (C) are identical to those in Formula (1), and the two benzene rings may further incorporate a halogen atom, an alkyl group, an alkoxy group, or an alkylthio group.

In the —X—Y group, X preferably is an oxygen atom, and in Formula (1) and Formulas (A), (B), and (C), $R_1$ and $R_2$ are preferably a methyl group.

Specific compounds of the initiator represented by Formula (1) will now be listed.

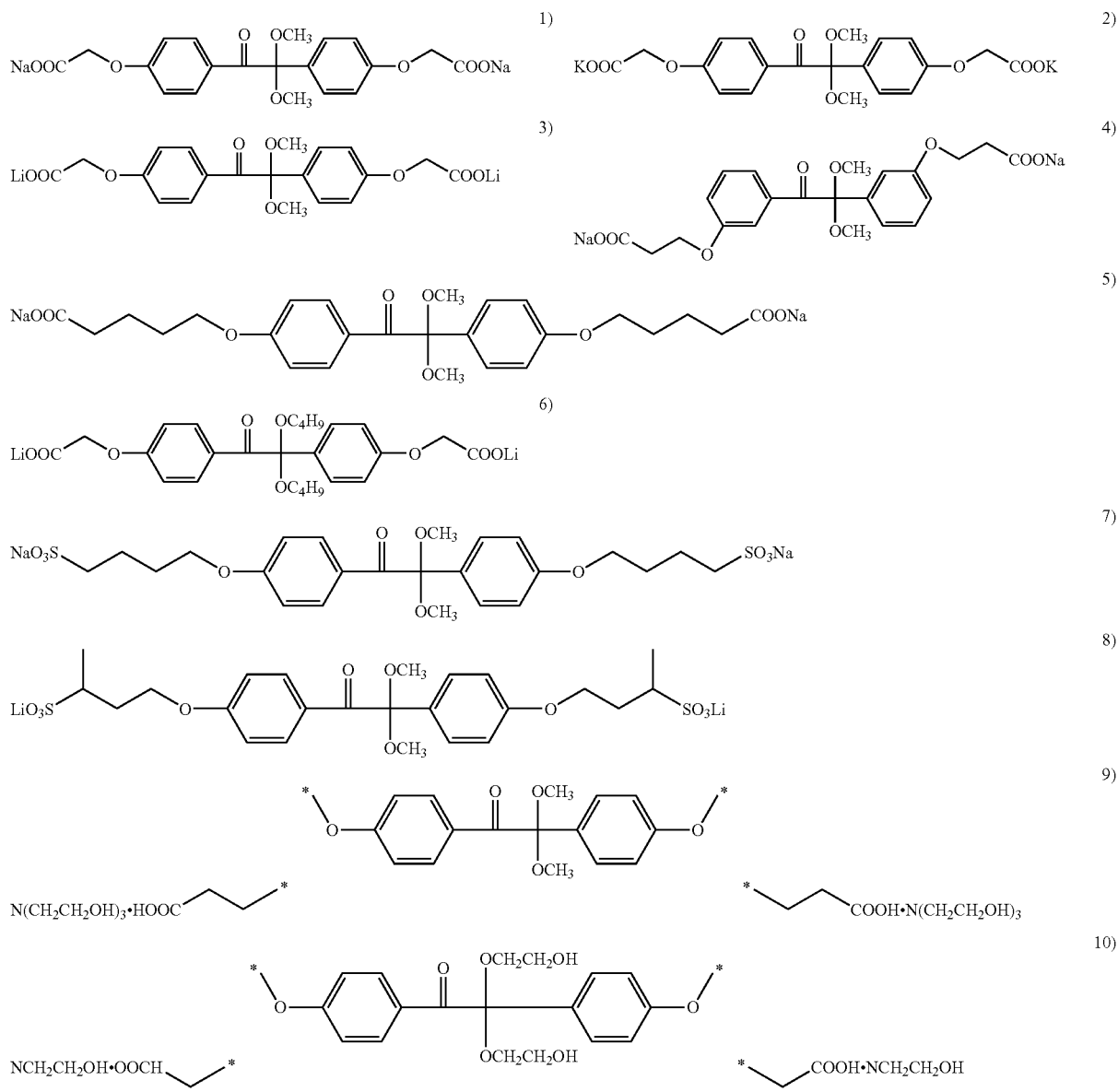

-continued
11)
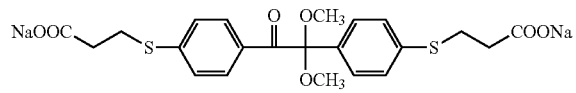
12)
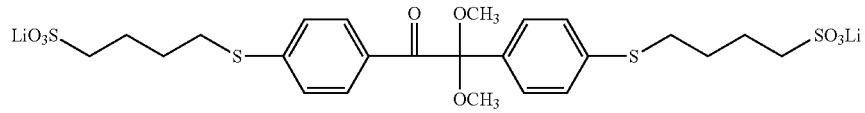
13)
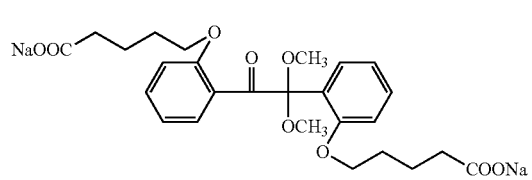
14)
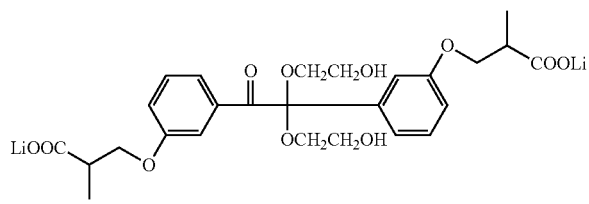
15)
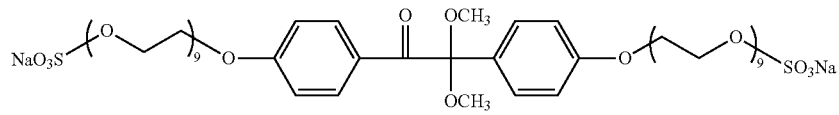
16)
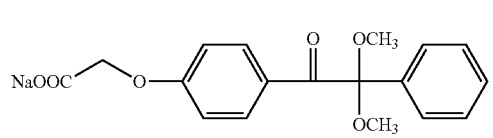
17)
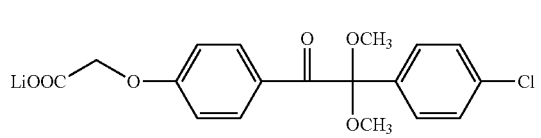
18)
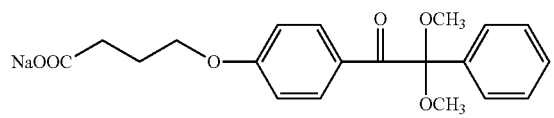
19)
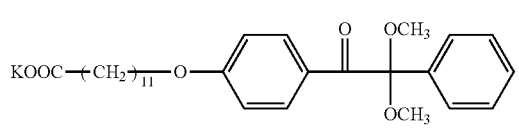
20)
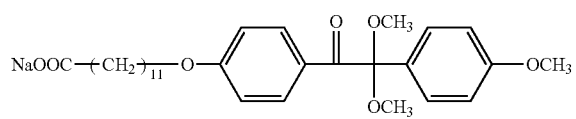
21)
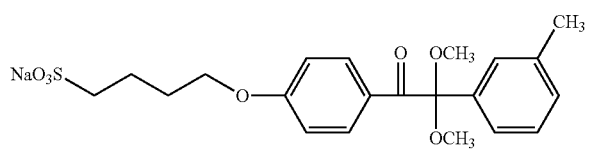
22)
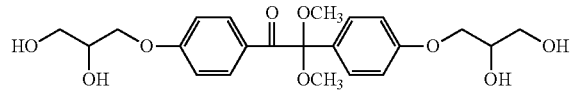
23)
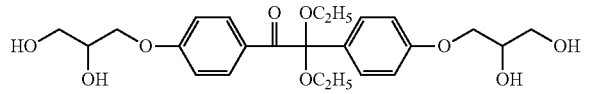
24)
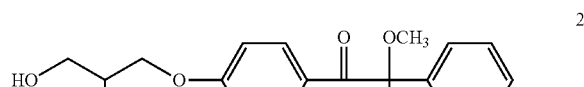
25)
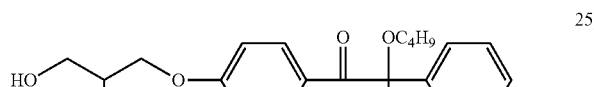
26)
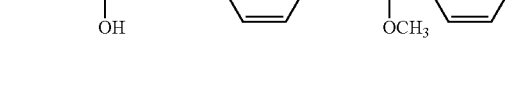
27)
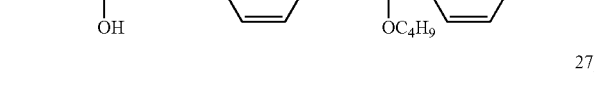
28)
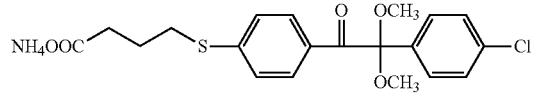
$m + n = 10$
29)
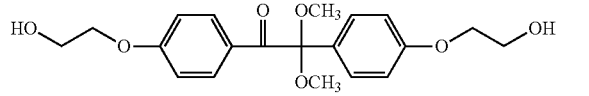

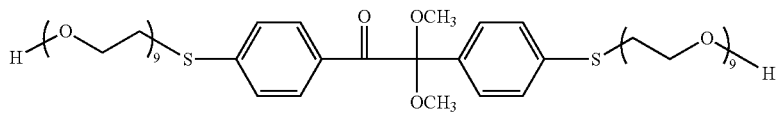

30)

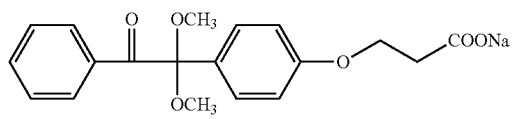

31)

32)

With regard to the solubility of an ethylenically unsaturated group, which is used along with the initiator of the present invention, water solubility is preferable. However, since some components of the group are water soluble in an aqueous curable composition, even though the group as a whole is not water-soluble, compounds to be used are not specifically limited. Since the initiator of the present invention is anionic, ionicity of an ethylenically unsaturated group-containing compound may be either nonionic or anionic, as long as it does not aggregate in a photocurable/crosslinkable composition. However, even a cationic compound may be added as long as it causes no aggregation.

<<Radical Polymerizable Group-Containing Compound>>

The "radical polymerizable group-containing compound" refers to a compound which incorporates at least one radical polymerizable group in the molecule. Specifically, examples of the compound include an ethylenically unsaturated group-containing compound exhibiting a double bond and an acethylenically unsaturated group-containing compound exhibiting a triple bond. Of these, the ethylenically unsaturated group-containing compound is preferable in view of chemical reactivity, production safety and cost.

<<Ethylenically Unsaturated Group-Containing Compound>>

The ethylenically unsaturated group-containing compound is a compound having at least one ethylenically unsaturated group therein, specifically a compound having at least one styrene group, acryl group, methacryl group, allyl group, crotonic acid group, maleic acid group, or itaconic acid group therein. A compound, having at least one acryl group or methacryl group, is preferable.

Examples of a compound having a styrene group include styrene and styrene sulfonate.

Examples of an acryl group and a methacryl group [hereinafter, both groups are referred to together as a (meth)acryl group] are cited as follows: (meth)acrylamide; a hydroxyalkyl(meth)acrylate such as 2-hydroxyethyl(meth)acrylate, 2-hydroxypropyl(meth)acrylate, or 1,4-butanediolmono(meth)acrylate; a polyolpoly(meth)acrylate having a hydroxyl group such as trimethylolpropanemono(meth)acrylate, trimethylolpropanedi(meth)acrylate, or a mono-, di-, or tri(meth)acrylate of pentaerythritol; a mono- or di(meth)acrylate of an alkylene glycol such as a mono- or di(meth)acrylate of ethylene glycol, or a mono- or di(meth)acrylate of propylene glycol; and a poly(meth)acrylate of an ethylene oxide adduct of a polyol such as hexanediol, nonanediol, trimethylolpropane, pentaerythritol, ditrimethylolpropane, tricyclodecanedimethylol, or dipentaerythritol.

Further, there are cited (meth)acrylonitrile, vinyl acetate, and, as a cationic unsaturated compound, a tertiary salt of a hydrochloride and a sulfate of a dialkylaminoalkyl(meth) acrylate such as dimethylaminoethyl(meth)acrylate, diethylaminoethyl(meth)acrylate, or diethylamino-2-hydroxypropyl(meth)acrylate.

Still further, there are cited a tertiary salt of a hydrochloride and a sulfate of a dialkylaminoalkyl(meth)acrylamide such as dimethylaminopropyl(meth)acrylamide, a quaternary salt of a halogenated alkyl adduct such as a methyl chloride adduct of a dialkylaminoalkyl(meth)acrylalate and of a halogenated aryl adduct such as a benzyl chloride adduct of a dialkylaminoalkyl(meth)acrylate, and a quaternary salt of a halogenated alkyl adduct such as a methyl chloride adduct a dialkylaminoalkyl(meth)acrylamide and of a halogenated aryl adduct such as a benzyl chloride adduct of a dialkylaminoalkyl (meth)acrylamide.

The ethylenically unsaturated group-containing compound may be an oligomer or a polymer. As an ionic group, a salt of a carboxyl group or of the acid group in sulfonic acid, an alkylene oxide group, and a hydroxyl group are exemplified.

More specifically, exemplified are a polymer prepared by adding glycidyl(meth)acrylate to a carboxyl group-containing copolymer, which is a copolymer of a (meth)acrylate and (meth)acrylic acid, and a salt of the polymer; those prepared by adding (meth)acrylic acid to an ester of a fatty acid and an alkyleneglycol monoglycidyl ether; a polyurethane (meth) acrylate or a polyester (meth)acrylate having an ethylene double bond at the terminals and a polyalkylene oxide at the alcohol portions; and a polyvinyl alcohol polymer combined with a (meth)acrylate via a connecting group.

Examples of the polyurethane (meth)acrylate include, as a polyol, a polyether polyol such as polyethylene glycol, polypropylene glycol, or polytetramethylene glycol, as well as a polyester diol such as ethylene glycol adipate, butanediol adipate, butanediol phthalate, or hexanediol phthalate.

As a polyisocyanate compound, exemplified are trilenediisocyanate, diphenylmethane diisocyanate, isophorone diisocyanate, hexamethylene diisocyanate, and hydrogenated diphenylmethane diisocyanate.

As a hydroxyl group-containing (meth)acrylate, exemplified is a hydroxyalkyl(meth)acrylate such as hydroxyethyl methacrylate or hydroxypropyl methacrylate.

As a polyester (meth)acrylate, exemplified is a reaction product of a polyester-type polyol with (meth)acrylic acid.

The polyester-type polyol includes, for example, a polyprotic acid such as succinic acid, maleic acid, adipic acid, sebacic acid, phthalic acid, tetrahydrophthalic acid, hexahydrophthalic acid, or trimellitic acid, and an anhydride thereof. The alcohol component includes a polyester alcohol prepared via reaction of ethylene glycol, butanediol, hexanediol, diethylene glycol, propylene glycol, dipropylene glycol, trimethylol propane, pentaerythritol, a triol of an ethylene oxide adduct or a propylene oxide adduct of trimethylol propane, a triol of an ethylene oxide adduct or a propylene oxide adduct of glycerin, or a tetraol of an ethylene oxide adduct or a propylene oxide adduct of pentaerythritol.

The ethylenically unsaturated group-containing compound may be used individually or in combination.

Examples of the polyvinyl alcohol polymer combined with a (meth)acrylate via a connecting group include a polymer prepared by combining a compound having a (meth)acryl group at one terminal and having an aldehyde group at the other terminal with hydroxyl groups of polyvinyl alcohol via acetalization, as described in JP-A Nos. 2000-181062 and 2004-189841. A resin (a nonionic one) represented by following Formula (2), as described in JP-A Nos. 2000-181062 and 2004-189841, is preferable from the viewpoint of reactivity.

Formula (2)

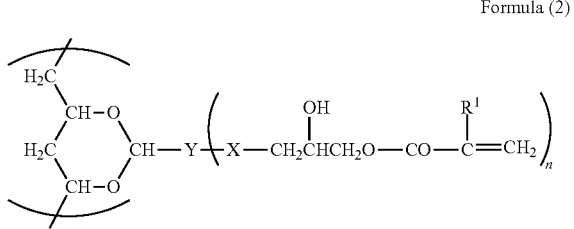

wherein $R^1$ is a methyl group or a hydrogen atom; n is 1 or 2; X is —$(CH_2)_m$—COO— or —O—; Y is an aromatic ring or a single bond; and m is an integer of 0-6.

Further, a photocurable modifying group (a nonionic one) represented by Formula (3), as described in JP-A No. 2004-161942, may be preferably employed for a water-soluble resin conventionally known in the art.

Formula (3)

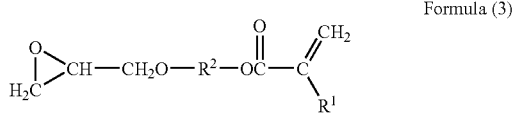

wherein $R^1$ is a methyl group or a hydrogen atom and $R^2$ is a straight chain or a branched alkylene group having 2-10 carbon atoms.

It is not preferable that pH of the ink-jet ink (hereinafter, also referred to simply as the ink) of the present invention is less than 5, since a photoinitiator according to the present invention tends to be hydrolyzed. Therefore, the pH needs to be at least 5, preferably at least 6.5.

Of the ethylenically unsaturated group-containing compounds, a compound featuring a molecular weight of at least 6000 is preferable, but more preferable is a polymer of a molecular weight of at least 6000 that has a plurality of side chains with ethylenically unsaturated groups in its hydrophilic main chain. The reason why the molecular weight needs to be at least 6000 is that, when the molecular weight is at least 6000, beading and bleeding can be efficiently prevented.

Although the mechanism is still a matter for speculation, it is conceivable that, when the molecular weight is at least 6000, even very limited polymerization/cross-linking of the ethylenically unsaturated groups in the molecule dramatically increases the molecular weight, and therefore the apparent viscosity of the molecule is increased, whereby beading and bleeding may be prevented in a short time.

A polymer having ethylenically unsaturated groups in its side chains is more preferable. For the reason, it is conceivable that, since a plurality of cross-linking groups are present in the side chain, the occurrence of combination of two portions between the side chains enables steric fixation, leading to curing in a shorter time.

The amount of an ethylenically unsaturated group-containing compound used for the ink-jet ink of the present invention is not specifically limited, provided that curing can be carried out with the amount.

<<Photoinitiators and Photosensitizers>>

In the present invention, in addition to a photoinitiator according to the present invention, any other appropriate photoinitiators or any appropriate photosensitizers may be added, if necessary.

These initiators, which may be added, are exemplified as follows:

1) benzophenones such as benzophenone, hydroxybenzophenone, bis-N,N-dimethylaminobenzophenone, bis-N,N-diethylaminobenzophenone, or 4-methoxy-4'-dimethylaminobenzophenone, and salts thereof;

2) thioxanthones such as thioxanthone, 2,4-diethylthioxanthone, isopropylthioxanthone, chlorothioxanthone, or isopropoxychlorothioxanthone, and salts thereof;

3) anthraquinones such as ethylanthraquinone, benzanthraquinone, aminoanthraquinone, or chloroanthraquinone;

4) acetophenones;

5) benzoin ethers such as benzoin methyl ether;

6) 2,4,6-trihalomethyltriazines;

7) 1-hydroxycyclohexyl phenyl ketone, imidazoles such as 2-(o-chlorophenyl)-4,5-diphenylimidazole dimers, 2-(o-chlorophenyl)-4,5-di(m-methoxyphenyl)imidazole dimers, 2-(o-fluorophenyl)-4,5-phenylimidazole dimers, 2-(o-methoxyphenyl)-4,5-phenylimidazole dimers, 2-(p-methoxyphenyl)-4,5-diphenylimidazole dimers, 2-di(p-methoxyphenyl)-5-phenylimidazole dimers, 2-(2,4-dimethoxyphenyl)-4,5-diphenylimidazole dimers, or 2,4,5-triarylimidazole dimers;

8) benzyldimethylketal, 2-benzyl-2-dimethylamino-1-(4-morpholinophenyl)butane-1-one, 2-methyl-1-[4-(methylthio)phenyl]-2-morpholino-1-propanone, 2-hydroxy-2-methyl-1-phenyl-propane-1-one, 1-[4-(2-hydroxyethoxy)-phenyl]-2-hydroxy-2-methyl-1-propane-1-one, phenanthrenequinone, 9,10-phenanthrenequinone, and benzoins such as methylbenzoin or ethylbenzoin;

9) acridine derivatives such as 9-phenylacridine or 1,7-bis(9,9'-acridinyl)heptane;

10) bisacylphosphine oxide, bisphenylphosphine oxide, and bis(2,4,6-trimethylbenzoil)-phenylphosphine oxide; and 11) 4-(2-hydroxyethoxy)phenyl-(2-hydroxy-2-propyl)ketone and ethylene oxides thereof.

Further, the above initiators may be added to the ink in the form of a dissolved material or a dispersed material, as appropriate.

Examples of the photosensitizers include ethyl p-dimethylaminobenzoate, isoamyl p-dimethylaminobenzoate, ethanolamine, diethanolamine, and triethanolamine.

The amount of a photoinitiator used for the ink-jet ink of the present invention may be 0.05-10% based on the ink amount. In cases of less than 0.05%, a larger amount of light is required for curing, resulting in economic disadvantages, and in cases of at least 10%, an excess amount of the initiator exists in an image, resulting in poor stability of the final image.

(Light Sources)

Any UV light sources featuring an emission light wavelength of 300-370 nm may be used with no specific limitation. Specifically, employed are those conventionally known in the art such as a low-pressure, a medium-pressure, or a high-pressure mercury lamp, a metal halide lamp, a xenon lamp featuring an emission light wavelength in the UV region, a cold-cathode tube, a hot-cathode tube, or an LED. However, in order for the initiator of the present invention to exert maximum performance, those featuring a higher emission intensity at a 365 nm light wavelength are preferable. From this viewpoint, a high-pressure mercury lamp and an LED featuring a 365 nm emission light wavelength are preferable.

(Light Irradiation Conditions after Ink Landing)

With regard to UV irradiation conditions, it is preferable to carry out UV irradiation 0.001-1.0 second after ink landing, more preferably 0.001-0.5 second after ink landing. To form an highly detailed image, it is specifically important that the irradiation timing is as early as possible.

(Lamp Setting)

As a UV irradiation method, a basic method is disclosed in JP-A No. 60-132767. According to this method, a light source is placed on both sides of a head unit, and the head and the light source are scanned via a shuttle method. Irradiation is carried out after a predetermined period of time after ink landing. Further, using another light source independent of driving, curing is completed.

U.S. Pat. No. 6,145,979 discloses, as irradiation methods, an optical fiber method and a method wherein a collimated light source is irradiated on a mirror surface placed on the side of a head unit and then UV light is irradiated onto a recording section. In the ink-jet recording method of the present invention, any one of these methods may be used.

Further, one of the preferred embodiments is also a method, wherein UV irradiation is divided into two steps: initially, UV is irradiated via the above method 0.001-2.0 seconds after ink langing; and further UV irradiation is carried out. Dividing the UV irradiation into two steps makes it possible to prevent recording material shrinkage which tends to occur during ink curing.

<<Colorants>>

As a colorant used for the ink-jet ink of the present invention, various appropriate dyes or pigments known in the ink-jet field may be used. However, from the viewpoint of UV irradiation and image stability, pigments are preferably used.

<Dyes>

Dyes usable in the present invention are not specifically limited, including water-soluble dyes such as acidic dyes, direct dyes, or reactive dyes, as well as dispersed dyes. Of these, anionic dyes are preferable.

<Water-soluble Dyes>

Water-soluble dyes usable in the present invention include, for example, azo dyes, methine dyes, azomethine dyes, xanthene dyes, quinone dyes, phthalocyanine dyes, triphenylmethane dyes, and diphenylmethane dyes. Specific compounds will now be listed that by no means limit the scope of the present invention.

<C. I. Acid Yellow>
Nos. 1, 3, 11, 17, 18, 19, 23, 25, 36, 38, 40, 42, 44, 49, 59, 61, 65, 67, 72, 73, 79, 99, 104, 110, 114, 116, 118, 121, 127, 129, 135, 137, 141, 143, 151, 155, 158, 159, 169, 176, 184, 193, 200, 204, 207, 215, 219, 220, 230, 232, 235, 241, 242, and 246

<C.I. Acid Orange>
Nos. 3, 7, 8, 10, 19, 24, 51, 56, 67, 74, 80, 86, 87, 88, 89, 94, 95, 107, 108, 116, 122, 127, 140, 142, 144, 149, 152, 156, 162, 166, and 168

<C. I. Acid Red>
Nos. 88, 97, 106, 111, 114, 118, 119, 127, 131, 138, 143, 145, 151, 183, 195, 198, 211, 215, 217, 225, 226, 249, 251, 254, 256, 257, 260, 261, 265, 266, 274, 276, 277, 289, 296, 299, 315, 318, 336, 337, 357, 359, 361, 362, 364, 366, 399, 407, and 415

<C. I. Acid Violet>
Nos. 17, 19, 21, 42, 43, 47, 48, 49, 54, 66, 78, 90, 97, 102, 109, and 126

<C. I. Acid Blue>
Nos. 1, 7, 9, 15, 23, 25, 40, 62, 72, 74, 80, 83, 90, 92, 103, 104, 112, 113, 114, 120, 127, 128, 129, 138, 140, 142, 156, 158, 171, 182, 185, 193, 199, 201, 203, 204, 205, 207, 209, 220, 221, 224, 225, 229, 230, 239, 249, 258, 260, 264, 278, 279, 280, 284, 290, 296, 298, 300, 317, 324, 333, 335, 338, 342, and 350

<C.I. Acid Green>
Nos. 9, 12, 16, 19, 20, 25, 27, 28, 40, 43, 56, 73, 81, 84, 104, 108, and 109

<C.I. Acid Brown>
Nos. 2, 4, 13, 14, 19, 28, 44, 123, 224, 226, 227, 248, 282, 283, 289, 294, 297, 298, 301, 355, 357, and 413

<C.I. Acid Black>
Nos. 1, 2, 3, 24, 26, 31, 50, 52, 58, 60, 63, 107, 109, 112, 119, 132, 140, 155, 172, 187, 188, 194, 207, and 222

<C.I. Direct yellow>
Nos. 8, 9, 10, 11, 12, 22, 27, 28, 39, 44, 50, 58, 79, 86, 87, 98, 105, 106, 130, 132, 137, 142, 147, and 153

<C.I. Direct Orange>
Nos. 6, 26, 27, 34, 39, 40, 46, 102, 105, 107, and 118

<C.I. Direct Red>
Nos. 2, 4, 9, 23, 24, 31, 54, 62, 69, 79, 80, 81, 83, 84, 89, 95, 212, 224, 225, 226, 227, 239, 242, 243, and 254 and <C.I. Direct Violet>
Nos. 9, 35, 51, 66, 94, and 95

<C.I. Direct Blue>
Nos. 1, 15, 71, 76, 77, 78, 80, 86, 87, 90, 98, 106, 108, 160, 168, 189, 192, 193, 199, 200, 201, 202, 203, 218, 225, 229, 237, 244, 248, 251, 270, 273, 274, 290, and 291

<C.I. Direct Green>
Nos. 26, 28, 59, 80, and 85

<C.I. Direct Brown>
Nos. 44, 106, 115, 195, 209, 210, 222, and 223

<C.I. Direct Black>
Nos. 17, 19, 22, 32, 51, 62, 108, 112, 113, 117, 118, 132, 146, 154, 159, and 169

<C.I. Basic Yellow>
Nos. 1, 2, 11, 13, 15, 19, 21, 28, 29, 32, 36, 40, 41, 45, 51, 63, 67, 70, 73, and 91

<C.I. Basic Orange>
Nos. 2, 21, and 22

<C.I. Basic Red>
Nos. 1, 2, 12, 13, 14, 15, 18, 23, 24, 27, 29, 35, 36, 39, 46, 51, 52, 69, 70, 73, 82, and 109

<C.I. Basic Violet>
Nos. 1, 3, 7, 10, 11, 15, 16, 21, 27, and 39

<C.I. Basic Blue>
Nos. 1, 3, 7, 9, 21, 22, 26, 41, 45, 47, 52, 54, 65, 69, 75, 77, 92, 100, 105, 117, 124, 129, 147, and 151

<C.I. Basic Green>
Nos. 1 and 4

<C.I. Basic Brown>
No. 1

<C.I. Reactive Yellow>
Nos. 2, 3, 7, 15, 17, 18, 22, 23, 24, 25, 27, 37, 39, 42, 57, 69, 76, 81, 84, 85, 86, 87, 92, 95, 102, 105, 111, 125, 135, 136, 137, 142, 143, 145, 151, 160, 161, 165, 167, 168, 175, and 176

<C.I. Reactive Orange>.
Nos. 1, 4, 5, 7, 11, 12, 13, 15, 16, 20, 30, 35, 56, 64, 67, 69, 70, 72, 74, 82, 84, 86, 87, 91, 92, 93, 95, and 107

<C.I. Reactive Red>

Nos. 2, 3, 5, 8, 11, 21, 22, 23, 24, 28, 29, 31, 33, 35, 43, 45, 49, 55, 56, 58, 65, 66, 78, 83, 84, 106, 111, 112, 113, 114, 116, 120, 123, 124, 128, 130, 136, 141, 147, 158, 159, 171, 174, 180, 183, 184, 187, 190, 193, 194, 195, 198, 218, 220, 222, 223, 228, and 235

<C.I. Reactive Violet>

Nos. 1, 2, 4, 5, 6, 22, 23, 33, 36, and 38

<C.I. Reactive Blue>

Nos. 2, 3, 4, 5, 7, 13, 14, 15, 19, 21, 25, 27, 28, 29, 38, 39, 41, 49, 50, 52, 63, 69, 71, 72, 77, 79, 89, 104, 109, 112, 113, 114, 116, 119, 120, 122, 137, 140, 143, 147, 160, 161, 162, 163, 168, 171, 176, 182, 184, 191, 194, 195, 198, 203, 204, 207, 209, 211, 214, 220, 221, 222, 231, 235, and 236

<C.I. Reactive Green>

Nos. 8, 12, 15, 19, and 21

<C.I. Reactive Brown>

Nos. 2, 7, 9, 10, 11, 17, 18, 19, 21, 23, 31, 37, 43, and 46

<C.I. Reactive Black>

Nos. 5, 8, 13, 14, 31, 34, and 39

<C.I. Food Black>

Nos. 1 and 2

<Pigments>

As pigments usable in the present invention, any appropriate organic and inorganic pigments conventionally known in the art may be used. For example, preferable are azo pigments such as azo lakes, insoluble azo pigments, condensed azo pigments, or chelate azo pigments; polycyclic pigments such as phthalocyanine pigments, perylene and perylene pigments, anthraquinone pigments, quinacridone pigments, dioxazine pigments, thioindigo pigments, isoindolinone pigments, or quinophtahrony pigments; dye lakes such as basic dye-type lakes or acidic dye-type lakes; organic pigments such as nitro pigments, nitroso pigments, aniline black, or daylight fluorescent pigments; and inorganic pigments such as carbon black. However, anion pigments are preferable.

Further, the ink-jet ink of this invention is characterized by excellent photo-curing sensitivity, and thus carbon black which is employed in a black ink is specifically preferable as a pigment to exhibit the full benefits of the characteristic.

Specific organic pigments will now be listed.

Magenta or red pigments include C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, C.I. and Pigment Red 222.

Orange or yellow pigments include C.I. Pigment Orange 31, C.I. Pigment Orange 43, C.I. Pigment Yellow 12, C.I. Pigment Yellow 13, C.I. Pigment yellow 14, C.I. Pigment Yellow 15, C.I. Pigment Yellow 17, C.I. Pigment yellow 74, C.I. Pigment Yellow 93, C.I. Pigment yellow 94, C.I. Pigment yellow 128, and C.I. Pigment Yellow 138.

Green or cyan pigments include C.I. Pigment Blue 15, C.I. Pigment Blue 15:2, C.I. Pigment Blue 15:3, C.I. Pigment Blue 16, C.I. Pigment Blue 60, and C.I. Pigment Green 7.

<Dispersing Agents>

Water-soluble polymer dispersing agents, used to stably disperse the above pigments in the ink, include water-soluble resins described below which are preferable from the viewpoint of ejection stability.

The water-soluble resins to be preferably used include those such as styrene-acrylic acid-alkyl acrylate copolymers, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic acid half ester copolymers, vinyl naphthalene-acrylic acid copolymers, or vinyl naphthalene-maleic acid copolymers.

The content of the water-soluble resins is preferably 0.1-10% by weight, more preferably 0.3-5% by weight based on the total ink amount.

The above water-soluble resins may be used individually or in combination.

<Anionic Pigments>

The form of an anionic pigment used in the present invention is preferably a pigment wherein the above pigment is dispersed using an anionic polymer dispersing agent or an anion-modified self-dispersed pigment from the viewpoint of dispersion stability.

The anionic polymer dispersing agent is a dispersing agent having an anionic group prepared by neutralizing an acidic group in its molecule with a basic compound. The basic compound used in this case includes a hydroxide of an alkali metal such as sodium hydroxide or potassium hydroxide, ammonia, and an amine such as an alkyl amine or an alkanolamine, but an amine is specifically preferable in the present invention.

Anionic polymer dispersing agents to be preferably used in the present invention are not specifically limited, provided that the agents feature molecular weights of at least 1000. Examples include polyvinyl alcohols; polyvinyl pyllori-dones; acryl resins such as polyacrylic acid, acrylic acid-acrylonitrile copolymers, potassium acrylate-acrylonitrile copolymers, vinyl acetate-acrylate copolymers, or acrylic acid-acrylate copolymers; styrene-acryl resins such as styrene-acrylic acid copolymers, styrene-methacrylic acid copolymers, styrene-methacrylic acid-acrylate copolymers, styrene-α-methylstyrene-acrylic acid copolymers, or styrene-α-methylstyrene-acrylic acid-acrylate copolymers; styrene-maleic acid copolymers; styrene-maleic anhydride copolymers; vinylnaphthalene-acrylic acid copolymers; vinylnaphthalene-maleic acid copolymers; vinyl acetate-based copolymers such as vinyl acetate-ethylene copolymers, vinyl acetate-fatty acid vinylethylene copolymers, vinyl acetate-maleate copolymers, vinyl acetate-crotonic acid copolymers, or vinyl acetate-acrylic acid copolymers; and copolymers or resins of salts thereof incorporating homopolymers, copolymers, or terpolymers having functional groups such as a carboxylic acid, a sulfonic acid, or a phosphonic acid.

Monomers providing acidic functional groups include, for example, acrylic acid, methacrylic acid, crotonic acid, maleic acid, maleic anhydride, itaconic acid, mesaconic acid, fumaric acid, citraconic acid, vinylacetic acid, acryloxypropionic acid, vinyl sulfonic acid, styrene sulfonic acid, 2-acrylamido-2-methylpropane sulfonic acid, ally sulfonic acid, allyl phosphonic acid, vinyl phosphonic acid, and vinyl sulfonic acid.

The anion-modified self-dispersed pigment to be preferably used in the present invention is referred to as a pigment, having an anionic group on the surface, which can be dispersed with no dispersing agent. The anionic self-dispersed pigment is a pigment that is capable of being dispersed in water with no dispersing agent, the pigment being modified with an acidic group that is then neutralized with a basic compound to form an anionic group.

A pigment particle having an acidic group on its surface is referred to as a pigment wherein the surface of the pigment particle is directly modified with an acidic group, or an organic compound, having an organic pigment mother nucleus, which is combined with an acidic group directly or via a joint.

The acidic group (referred to also as the polar group) includes, for example, a sulfonic acid group, a carboxylic acid group, a phosphonic acid group, a boric acid group, and a hydroxyl group, but the sulfonic acid group and the carboxylic acid group are preferable, and further the sulfonic acid group is more preferable.

A modifying agent having an acidic group includes a treatment agent containing a sulfur atom such as sulfuric acid, fuming sulfuric acid, sulfur trioxide, chlorosulfuric acid, fluorosulfuric acid, amidosulfuric acid, a sulfonated pyridine salt, or sulfamic acid; and a carboxylating agent such as sodium hypochlorite or potassium hypochlorite which functions to introduce a carboxylic acid group via oxidation of the pigment particle surface. Of these, a sulfonating agent such as sulfur trioxide, a sulfonated pyridine salt, or sulfamic acid, or a carboxylating agent is preferable.

A basic compound, which functions to neutralize the acidic group, includes a hydroxide of an alkali metal such as sodium hydroxide or potassium hydroxide, ammonia, and an amine such as an alkyl amine or an alkanol amine, but the amine is specifically preferable in the present invention.

As a method of preparing a pigment particle having a polar group on its surface, mentioned is a method wherein, via oxidation of the pigment particle surface with an appropriate oxidant, a polar group such as a sulfonic acid group or a salt thereof is introduced onto at least part of the pigment surface, as described, for example, in WO 97/48769, JP-A Nos. 10-110129, 11-246807, 11-57458, 11-189739, 11-323232, and 2000-265094.

Specifically, employable is a preparation method wherein carbon black is oxidized with concentrated nitric acid, or in cases of a color pigment, the color pigment is oxidized with sulfamic acid, a sulfonated pyridine salt, or amidosulfuric acid in sulfolane or N-methyl-2-pyrrolidone. Via removal of soluble products formed via excess oxidation and via the following purification, a pigment dispersion can be prepared. Further, when a sulfonic acid group is introduced onto the pigment surface via oxidation, the acidic group may be neutralized with a basic compound, if appropriate.

Other methods include a method of allowing a pigment derivative to adsorb to the pigment particle surface via treatment such as milling, as described in JP-A Nos. 11-49974, 2000-273383, and 2000-303014, as well as a method wherein a pigment is dissolved in a solvent together with a pigment derivative, followed by being crystallized in a poor solvent, as described in JP-A Nos. 2002-179977 and 2002-201401. Via any one of the methods, a pigment particle having a polar group on its surface can be readily prepared.

The average particle diameter of a pigment dispersion used for the ink-jet ink of the present invention is preferably at most 500 nm, more preferably at most 200 nm, and further, preferably from 10 nm-200 nm, more preferably from 10 nm-150 nm. When the average particle diameter of the pigment dispersion exceeds 500 nm, unstable dispersion tends to result. Further, when the average particle diameter of the pigment dispersion is less than 10 nm, the stability of the pigment dispersion is also likely to decrease, resulting in a tendency to degrade storage stability of the ink.

Particle diameter measurement of the pigment dispersion is carried out with a commercially available particle diameter analyzer employing a light scattering method, an electrophoretic method, or a laser Doppler method. It is also possible to conduct the measurement via photographic particle images of at least 100 particles with a transmission electron microscope, followed by statistically processing these images using an image analyzing software such as Image-Pro (produced by Media Cybernetics, Inc.).

As a pigment dispersing method, employable are various methods such as a ball mill, a sand mill, an atriter, a roll mill, an agitator, a Henschel mixer, a colloid mill, an ultrasonic homogenizer, a pearl mill, a wet-type jet mill, or a paint shaker.

The content of a colorant, dispersible or soluble in water, used for the ink-jet ink of the present invention is preferably from 1-10% by weight based on the total ink weight.

<<Water-Soluble Solvents>>

As solvents according to the present invention, water-soluble media are preferably used. As the water-soluble media, mixed solvents of water and water-soluble organic solvents are more preferably used.

Preferable examples of the water-soluble organic solvents include alcohols (for example, methanol, ethanol, propanol, isopropanol, butanol, isobutanol, sec-butanol, and tert-butanol), polyols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), polyol ethers (for example, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol monomethyl ether, propylene glycol monobutyl ether, ethylene glycol monomethyl ether acetate, triethylene glycol monomethyl ether, triethylene glycol monoethyl ether, triethylene glycol monobutyl ether, triethylene glycol monophenyl ether, and propylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine), amides (for example, formamide, N,N-dimethylformamide, and N,N-dimethylacetamide), heterocycles (for example, 2-pyrrolidone, N-methyl-2-pyrrolidone, cyclohexyl pyrrolidone, 2-oxazolidone, and 1,3-dimethyl-2-imidazolidinone), and sulfoxides (for example, dimethylsulfoxide).

<Surfactants>

Preferable surfactants used for the ink of the present invention include anionic surfactants such as alkyl sulfates, alkyl ester sulfates, dialkylsulfosuccinates, alkylnaphthalene sulfonates, alkyl phosphates, polyoxyalkylene alkyl ether phosphates, or fatty acid salts; nonionic surfactants such as polyoxyethylene alkyl ethers, polyoxyalkylene alkylphenyl ethers, acetylene glycols, or polyoxyethylene-polyoxypropylene block copolymers; surfactants such as glycerin esters, sorbitan esters, polyoxyethylene fatty acid amides, or amine oxides; and cathionic surfactants such as alkyl amine salts or quaternary ammonium salts.

These surfactants may be used as a dispersing agent for a pigment, and of these, specifically, the anionic surfactants can be preferably used.

<Various Additives>

In the present invention, other additives conventionally known in the art may be contained, including, for example, fluorescent brighteners, antifoamers, lubricants, preservatives, thickeners, antistatic agents, matting agents, water-soluble polyvalent metal salts, acids and bases, pH adjusters such as buffer solutions, antioxidants, surface tension adjusters, specific resistance regulators, anti-corrosion agents, and inorganic pigments.

<Recording Paper>

Paper includes coated paper and non-coated paper. The coated paper includes art paper in which the coated amount on one side is approximately 20 g/m², coated paper in which the coated amount on one side is approximately 10 g/m², light weight coated paper in which the coated amount on one side is approximately 5 g/m², ultra light weight coated paper, matte finished coated paper, dull tone finished double coated paper, and newsprint paper.

The non-coated paper includes printing paper A employing 100 percent chemical pulp, printing paper B employing at least 70 percent chemical pulp, printing paper C employing 40 percent-less than 70 percent chemical pulp, printing paper D employing less than 40 percent chemical pulp, and gravure paper, incorporating mechanical pulp, which has been subjected to calendering. More detailed reference will be made to "Saishin Kamikako Binran (Handbbok of Recent Paper Treatments)", edited by Kako Binran Henshuiinkai, published by Tech Times and "Insatsu Kogaku Binran (Printing Engineering Handbook)", edited by Nihon Insatsu Gakkai.

As plain paper, used are 80-200 μm thick non-coated paper belonging to a part of non-coated paper sheets, special printing paper sheets, and information sheets. Examples of plain paper include high quality printing paper, medium quality printing paper, low quality printing paper, thin printing paper, ultra light weight coated printing paper, special printing paper such as high quality colored paper, form paper sheets, PPC sheets, and other kinds such as information sheets. Specifically, available are paper sheets described below and various modified/treated paper sheets, but the present invention is not limited thereto.

There may be listed high quality paper, high quality colored paper, recycled paper, copying paper/colored ones, OCR paper, non-carbon paper/colored ones, synthetic paper such as 60, 80, and 110 micron YUPO, and 70 and 90 micron YUPOCOAT, others such as ONE SIDE ART PAPER 68 kg, COATED PAPER 90 kg, MATTE FORM PAPER 70, 90, and 110 kg, FOAMED PET 38 micron, and MITSUORIKUN (all produced by Kobayashi Kirokushi Co., Ltd.); OK HIGH QUALITY PAPER, NEW OK HIGH QUALITY PAPER, SUN FLOWER, PHOENIX, OK ROYAL WHITE, EXPORT HIGH QUALITY PAPER(NPP, NCP, NWP, and ROYAL WHITE), OK BOOK PAPER, OK CREAM BOOK PAPER, CREAM HIGH QUALITY PAPER, OK MAP PAPER, OK ISHIKARI, KYUUREI, OK FORM, OKH, and NIP-N (all produced by New Oji Paper Co., Ltd.); KINO, TOKO, EXPORT HIGH QUALITY PAPER, SPECIAL DEMAND HIGH QUALITY PAPER, BOOK PAPER, BOOK PAPER L, PALE CREAM BOOK PAPER, ELEMENTARY SCHOOL SCIENCE TEXT BOOK PAPER, CONTINUOUS SLIP PAPER, HIGH QUALITY NIP PAPER, GINKAN, KINYO, KINYO (W), BRIDGE, CAPITAL, GINKAN BOOK PAPER, HARP, HARP CREAM, SK COLOR, SECURITY PAPER, OPERA CREAM, OPERA, KYP CARTE, SYLVIA HN, EXCELLENT FORM, and NPI FORM DX (all produced by Nippon Paper Industries Co., Ltd.); PEARL, KINRYO, PALE CREAM HIGH QUALITY PAPER, SPECIAL BOOK PAPER, SUPER BOOK PAPER, DIAFORM, and INK-JET FORM (all produced by Mitsubishi Paper Mills Ltd.); KINMO V, KINMO SW, HAKUZO, HIGH QUALITY PUBLISHING PAPER, CREAM KINMO, CREAM HAKUZO, SECURITY/TRADABLE COUPON PAPER, BOOK PAPER, MAP PAPER, COPING PAPER, and HNF (all produced by Hokuetsu Paper Mills, Ltd.); SIORAI, TELEPHONE DIRECTORY COVER, BOOK PAPER, CREAM SHIORAI, CREAM SHIORAI MEDIUM ROUGH, CREAM SHIORAI HIGH ROUGH, and DSK (all produced by Daishowa Paper Manufacturing Co., Ltd.); SENDAI MP HIGH QUALITY PAPER, KINKO, RAICHO HIGH QUALITY, HANGING PAPER, COLORED PAPER BASE PAPER, DICTIONARY PAPER, CREAM BOOK, WHITE BOOK, CREAM HIGH QUALITY PAPER, MAP PAPER, and CONTINUOUS SLIP PAPER (all produced by Chuetsu Paper & Pulp Co., Ltd.); OP KINO(CHUETSU), KINSA, REFERENCE PAPER, TRADABLE COUPON PAPER (WHITE)), FORM PRINTING PAPER, KRF, WHITE FORM, COLOR FORM, (K)NIP, FINE PPC, and KISHU INK-JET PAPER (all produced by Kishu Paper Co., Ltd.); TAIOU, BRIGHT FORM, KANT, KANT WHITE, DANTE, CM PAPER, DANTE COMIC, HEINE, PAPER BACKS PAPER, HEINE S, NEW AD PAPER, UTRILLO EXCEL, EXCEL SUPER A, KANT EXCEL, EXCEL SUPER B, DANTE EXCEL, HEINE EXCEL, EXCEL SUPER C, EXCEL SUPER D, AD EXCEL, EXCEL SUPER E, NEW BRIGHT FORM, and NEW BRIGHT NIP (all produced by Daio Paper Corp.); NICHIRIN, GETSURIN, UNREI, GINGA, HAKUUN, WAISU, GETURIN ACE, HAKUUN ACE, and UNKIN ACE (all produced by Japan Paper Industry Co., Ltd.); TAIOU, BRIGHT FORM, and BRIGHT NIP (all produced by Nagoya Pulp Co., Ltd.); BOTAN A, KINBATO, TOKU BOTAN, SHIROBOTAN A, SHIROBOTAN C, GINBATO, SUPER SHIROBOTAN A, PALE CREAM SHIROBOTAN, SPECIAL MEDIUM QUALITY PAPER, SHIROBATO, SUPER MEDIUM QUALITY PAPER, AO BATO, AKA BATO, KIN BATO M SNOW VISION, SNOW VISION, KIN BATO SNOW VISION, SHIRO BATO M, SUPER DX, HAMANASU O, AKA BATO M, and HK SUPER PRINTING PAPER (all produced by Honshu Paper Co., Ltd.); STAR LINDEN (A-AW), STAR ELM, STAR MAPLE, STAR LAUREL; STAR POPLAR, MOP, STAR CHERRY I, CHERRY I SUPER, CHERRY II SUPER, STAR CHERRY III, STAR CHERRY IV, CHERRY III SUPER, and CHERRY IV SUPER (all produced by Marusumi Paper Co., Ltd.); SHF (produced by Toyo Pulp Co., Ltd.); and TRP (produced by Tokai Pulp & Paper Co., Ltd.).

<Various Films>

As various films to be used, any commonly used films are available. Exemplified are polyester film, polyolefin film, polyvinyl chloride film, and polyvinylidene chloride film. Further, there may be usable resin coated paper, which is photographic paper, and YUPO paper, which is synthetic paper.

<Various Ink-Jet Recording Media>

Ink-jet recording media are those which are prepared in such a manner that an absorptive or a non-absorptive support is used as a substrate and an ink receptive layer is formed on its surface. Some of ink receptive layers are composed of a coated layer, a swelling layer, and a minute void layer. The swelling layer absorbs ink while an ink receptive layer composed of a water-soluble polymer swells. The minute void layer is composed of inorganic or organic fine particles of a secondary particle diameter of about 20-about 200 nm, and a binder, and minute voids of about 100 nm absorb ink.

In recent years, as recording media which produce photographic images, there are preferably used ink-jet recording media, in which the above minute void layer is provided on RC paper which is prepared by covering both sides of a paper substrate with an olefin resin.

(Preparation Methods of Materials Used for the Ink-Jet Ink of the Present Invention)

To prepare a photoinitiator according to the present invention, a benzyl derivative, which is a precursor of a photoinitiator, is subjected to ketal reaction, followed by hydrolysis, if appropriate, to give the targeted substance.

Methods of preparing the benzyl derivative are commonly well known, including a method via the Friedel-Crafts reaction of a phenyl compound and oxalyl chloride and a method of oxidizing benzoin in order to prepare a symmetrical benzyl compound. Also, in cases of preparing an unsymmetrical benzyl compound, a benzyl phenyl ketone derivative is prepared via the Friedel-Crafts reaction of phenylacetyl chloride and a phenyl compound, followed by bromination and by dehydrogen bromide reaction using an alcoxide to give a benzyl derivative.

As the following ketal reaction, reaction under acidic or basic conditions, in which thionyl chloride and methanol, or DMF and sodium methoxide are respectively employed, is widely known. However, these reaction conditions tend to yield only a small amount of a ketal compound that is a precursor of the photoinitiator according to the present invention. Accordingly, it has been necessary to use an orthoformate and an alcohol employing p-toluenesulfonic acid or trifluoromethanesulfonic acid. Further, in view of the yield, trifluoromethanesulfonic acid is preferably employed.

Synthesis of Exemplified Compound 1)

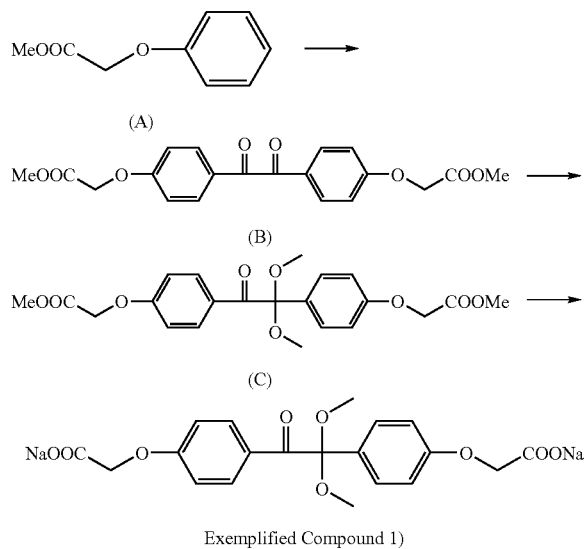

Exemplified Compound 1)

(Synthesis of Compound B)

Ice-cooled is 11.7 g (84 mmol) of aluminum chloride having been added in 33 ml of dichloromethane. At an interior temperature of at most 15° C., 6.6 g (40 mmol) of methyl phenoxyacetate (compound A) is dipped, followed by slowly dipping 2.8 g (22 mmol) of oxalyl chloride. Then, a great amount of hydrogen chloride gas is generated. After termination of the generation of hydrogen chloride gas, the reaction liquid is poured into 100 g of ice water, followed by adding 30 ml of ethyl acetate and by stirring to precipitate a crystal. This crystal is filtered and washed to give 2.5 g of compound B as a white crystal.

(Synthesis of Compound C)

A mixture of 23.9 g (62 mmol) of compound B, 65.6 g (620 mmol) of trimethyl orthoformate, 19.8 g (618 mmol) of methanol, and 360 ml of toluene is refluxed. Into this liquid, 2.8 g (18.6 mmol) of trifluoromethanesulfonic acid is added by dipping, followed by being further refluxed for 5 hours. Then, this resultant liquid is poured into a liquid containing ethyl acetate and a sodium hydrogen carbonate aqueous solution while mixing, and then an ethyl acetate layer formed is isolated, followed by being evaporated. As a white crystal, 18.8 g of compound C is obtained via column-separation and purification.

[Synthesis of Exemplified Compound 1)]

A mixture of 16.7 g of compound C, 130 ml of methanol, and 10 ml of a 30% by weight aqueous solution of sodium hydroxide is refluxed for 2 hours. Then, a precipitated yellow substance is isolated via filtration, followed by distilling away the solvent. A resultant transparent oil is crystallized via addition of ethanol, followed by being filtered and dried to give 15.1 g of Exemplified Compound 1).

The compound was verified using $^1$H-NMR.

[Synthesis of Polyvinyl Alcohol Polymer (Acryl Group-Containing Polyvinyl Alcohol) Combined with a (Meth) Acrylate Via a Connecting Group]

A reaction container was charged with 56 g of glycidyl methacrylate, 48 g of p-hydroxybenzaldeyde, 2 g of pyridine, and 1 g of N-nitroso-phenylhydroxyamine ammonium salt, followed by being stirred for 8 hours in an 80° C. water bath.

Subsequently, 45 g of saponified polyvinyl acetate, featuring a 500 polymerization degree and an 88% saponification rate, was dispersed in 225 g of ion-exchanged water, and then 4.5 g of phosphoric acid and p-(3-methacryloxy-2-hydroxypropyloxy)benzaldehyde, having been prepared via the above reaction, were added to the resultant solution in such a manner that the modification rate is allowed to be 3 mol % based on polyvinyl alcohol, followed by being heated at 90° C. for 6 hours. The thus-prepared solution was cooled to room temperature, followed by addition of 30 g of a basic ion-exchanged resin, and by stirring for 1 hour. Then, the ion-exchanged resin was filtered, followed by dilution with ion-exchanged water to give an acryl group-containing polyvinyl alcohol of a 10% concentration.

EXAMPLES

The present invention will now be detailed with reference to examples that by no means limit the scope of the present invention. Incidentally, "%" to be shown in the examples is "% by weight" unless otherwise specified.

Example 1

Preparation of Black Pigment Dispersion

Each of the additives described below was mixed and dispersed using a sand grinder filled with zirconia beads of 0.5 mm whose volume ratio was 50%, followed by dilution with water to give a black pigment dispersion having a black pigment content of 10%. The average particle diameter of black pigment particles contained in this black pigment dispersion was 106 nm. Herein, the particle diameter was determined using Zetasizer 1000 HS (produced by Malvern Instruments Ltd).

Carbon black 10 parts
Polymer dispersing agent (styrene/acrylic acid/n-butyl acrylate copolymer, weight average molecular weight: 15,000, glass transition point: 70° C.) 3 parts
Glycerin 15 parts
Ion-exchanged water 60 parts
[Preparation of Black Ink 1]
Black pigment dispersion 30 parts A-400 (polyethyleneoxyacrylate, molecular weight: 500, produced by Shin-Nakamura Chemical Co., Ltd.) 5 parts UA-W2A (water-soluble urethane acrylate oligomer, produced by Shin-Nakamura Chemical Co., Ltd.) 5 parts Diethylene glycol 20 parts Photoinitiator (refer to Tables 2-5) 1.2 parts Olfin E1010 (produced by Nissin Chemical Industry Co., Ltd.) 0.3 part Purified water was added to 100 parts. The resultant product was designated as Black Ink 1.

[Preparation of Black Ink 2]

Black pigment dispersion 30 parts

Acryl group-containing polyvinyl alcohol (polymerization degree: 500, modification rate: 39, and concentration: 10%) 30 parts Diethylene glycol 30 parts Photoinitiator (refer to Tables 2-5) 1.2 parts Olfin E1010 (produced by Nissin Chemical Industry Co., Ltd.) 0.3 part Purified water was added to 100 parts. The resultant product was designated as Black Ink 2.

[Preparation of Black Inks 3, 4, and 5]

Black Inks 3, 4, and 5, each of which has the composition described in Table 1, were prepared. Herein, DEG and EG therein represent diethylene glycol and ethylene glycol, respectively.

TABLE 1

| | Black Ink | | | | |
|---|---|---|---|---|---|
| | No. 1 | No. 2 | No. 3 | No. 4 | No. 5 |
| Black Pigment Dispersion (concentration: 10%) | 30 | 30 | 30 | 30 | 30 |
| A-400 | 5 | | | 20 | 10 |
| UA-W2A | 5 | | | | |
| Acryl Group-containing Polyvinyl Alcohol (concentration: 10%) | | 30 | 40 | | 10 |
| Photoinitiator | 1.2 | 1.2 | 3 | 20 | 2.4 |
| Water-soluble Solvent | DEG 20 | DEG 30 | DEG 20 | EG 20 | EG 20 |
| Olfin E-1010 | 0.3 | 0.3 | 0.3 | 0.3 | 0.3 |
| Water | the rest | the rest | the rest | the rest | the rest |
| pH | 6.5 | 8.3 | 8.4 | 7.3 | 6.8 |

[Image Formation]

<Employment of a High Pressure Halogen Lamp>

There was set up an on-demand type ink-jet printer, loaded with a piezo type head of a nozzle orifice diameter of 25 μm, a driving frequency of 12 kHz, 128 nozzles, and a nozzle density of 180 dpi (dpi refers to the number of dots per 2.54 cm), featuring a maximum recording density of 720×720 dpi, wherein a high pressure halogen lamp (produced by Ushio Inc.) was placed on both ends of the piezo type head. A solid black image was printed on art paper while being irradiated with the high pressure halogen lamp at a light intensity of 100 mJ/cm$^2$, and then hot-air dried for 1 minute using a drier, followed by being naturally dried for 24 hours.

<Employment of an LED Lamp>

Instead of the high pressure halogen lamp, an LED (produced by Nichia Corp.) of a 365 nm emission light wavelength was used to form an image, with other things remaining the same.

[Image Evaluation]

(Ink Ejection Stability)

Under the above formation conditions for an ink-jet image, a line and a solid images with a given interval therebetween were continuously printed on 9 sheets of art paper at each of ambiences of 40° C. and 30% RH, as well as 20° C. and 70% RH. Then, printing was stopped for 10 minutes, followed by printing of the tenth sheet. The ejection state of the nozzle on printing of the tenth sheet was visually observed and the ink ejection stability was evaluated based on the following criteria.

A: No variation of the ejection state was observed in all of the nozzles.

B: Slanting ejection of the ink was observed in 1-2% by number of the nozzles, but no nozzle clogging was observed.

C: Nozzle clogging was observed in less than 3-10% by number of the nozzles.

D: Nozzle clogging was observed in at least 10% by number of the nozzles.

(Evaluation of Glossiness Uniformity)

Image and non-image portions of each of the resulting solid magenta images were visually observed and the glossiness uniformity was evaluated based on the following criteria.

A: An excellent uniform image exhibiting no glossiness difference between the printed portion and the non-printed portio.

B: An almost uniform image exhibiting a slight glossiness difference between the printed portion and the non-printed portion C: A non-uniform image exhibiting a difference in feeling of glassiness or roughness between the printed portion and the non-printed portion (Evaluation of Beading)

The density uniformity of each of the resultant solid black images was visually observed and the image uniformity was evaluated based on the following criteria.

A: The density of the solid image was uniform.

B: The density of the solid image was non-uniform but the non-uniformity was unnoticeable.

C: The density of the solid image was apparently non-uniform.

(Evaluation of Storage Stability of Ink under Fluorescent Lighting)

In a 50 ml beaker, 20 ml of each of the black inks, having been prepared above, was placed, followed by being 100-Watt fluorescent-lighted for 24 hours to evaluate the storage stability of the ink.

A: No variation of the ink was observed.

B: Gelation of part of the ink was observed.

C: Insoluble material generated was observed.

TABLE 2

| Photoinitiator | Ink No. | Ink Ejection Stability | Glossiness Uniformity | Beading under LED Lighting | Beading under High Pressure Mercury Lighting | Ink Storage Stability under Room Lighting | Remarks |
|---|---|---|---|---|---|---|---|
| 1) | 1 | B | A | B | A | A | Inv. |
|    | 2 | A | A | A | A | A |      |
|    | 3 | B | A | A | A | A |      |
|    | 4 | A | B | A | A | A |      |
|    | 5 | B | A | A | A | A |      |
| 3) | 1 | B | A | B | A | A | Inv. |
|    | 2 | A | A | A | A | A |      |
|    | 3 | B | A | A | A | A |      |
|    | 4 | A | B | A | A | A |      |
|    | 5 | B | A | A | A | A |      |
| 9) | 1 | B | A | B | A | A | Inv. |
|    | 2 | A | A | A | A | A |      |
|    | 3 | B | A | A | A | A |      |
|    | 4 | A | B | A | A | A |      |
|    | 5 | B | A | A | A | A |      |
| 7) | 1 | B | A | B | A | A | Inv. |
|    | 2 | A | A | A | A | A |      |
|    | 3 | B | A | A | A | A |      |
|    | 4 | A | B | A | A | A |      |
|    | 5 | B | A | A | A | A |      |
| 6) | 1 | B | A | B | A | A | Inv. |
|    | 2 | A | A | A | A | A |      |
|    | 3 | B | A | A | A | A |      |
|    | 4 | A | B | A | A | A |      |
|    | 5 | B | A | A | A | A |      |

Inv.: Present Invention

TABLE 3

| Photoinitiator | Ink No. | Ink Ejection Stability | Glossiness Uniformity | Beading under LED Lighting | Beading under High Pressure Mercury Lighting | Ink Storage Stability under Room Lighting | Remarks |
|---|---|---|---|---|---|---|---|
| 16) | 1 | A | A | B | B | A | Inv. |
|     | 2 | A | A | A | A | A |      |
|     | 3 | A | A | A | A | A |      |
|     | 4 | A | A | A | A | A |      |
|     | 5 | B | A | A | A | A |      |
| 20) | 1 | B | A | B | A | A | Inv. |
|     | 2 | A | A | A | A | A |      |
|     | 3 | A | A | A | A | A |      |
|     | 4 | A | A | A | A | A |      |
|     | 5 | B | A | A | A | A |      |
| 23) | 1 | B | A | B | B | A | Inv. |
|     | 2 | B | A | A | A | A |      |
|     | 3 | B | A | A | A | A |      |
|     | 4 | B | B | A | A | A |      |
|     | 5 | B | A | A | A | A |      |
| 24) | 1 | B | A | B | A | A | Inv. |
|     | 2 | A | A | A | A | A |      |
|     | 3 | A | A | A | A | A |      |
|     | 4 | A | A | A | A | A |      |
|     | 5 | B | A | A | A | A |      |
| 11) | 1 | B | A | A | A | A | Inv. |
|     | 2 | A | A | A | A | A |      |
|     | 3 | A | A | A | A | A |      |
|     | 4 | A | A | A | A | A |      |
|     | 5 | B | A | A | A | A |      |

Inv.: Present Invention

TABLE 4

| Photoinitiator | Ink No. | Ink Ejection Stability | Glossiness Uniformity | Beading under LED Lighting | Beading under High Pressure Mercury Lighting | Ink Storage Stability under Room Lighting | Remarks |
|---|---|---|---|---|---|---|---|
| 26) | 1 | B | A | B | B | A | Inv. |
| | 2 | A | A | A | A | A | |
| | 3 | A | A | A | A | A | |
| | 4 | A | A | A | A | A | |
| | 5 | B | A | A | A | A | |
| 28) | 1 | B | B | B | B | A | Inv. |
| | 2 | A | A | A | A | A | |
| | 3 | B | A | A | A | A | |
| | 4 | A | B | B | B | A | |
| | 5 | B | A | B | B | A | |

Inv.: Present Invention

TABLE 5

| Photoinitiator | Ink No. | Ink Ejection Stability | Glossiness Uniformity | Beading under LED Lighting | Beading under High Pressure Mercury Lighting | Ink Storage Stability under Room Lighting | Remarks |
|---|---|---|---|---|---|---|---|
| Compound A | 1 | B | B | C | C | A | Comparative |
| | 2 | A | B | C | B | A | Example |
| | 3 | B | B | C | C | A | |
| | 4 | B | C | C | B | A | |
| | 5 | B | B | B | B | A | |
| Compound B | 1 | B | C | C | C | A | Comparative |
| | 2 | A | B | C | C | A | Example |
| | 3 | B | B | C | C | A | JP-A No. |
| | 4 | B | C | C | C | A | 2000-186243 |
| | 5 | B | C | C | C | A | |
| Compound C | 1 | B | C | C | C | A | Comparative |
| | 2 | B | C | C | C | A | Example |
| | 3 | B | C | C | C | A | JP-A No. |
| | 4 | B | C | C | C | A | 2003-192712 |
| | 5 | B | C | C | C | A | |
| Compound D | 1 | B | A | B | A | C | Comparative |
| | 2 | B | A | A | A | C | Example |
| | 3 | B | A | A | A | C | JP-A No. |
| | 4 | B | A | B | A | C | 2005-307199 |
| | 5 | B | A | B | A | C | |
| Compound E | 1 | B | C | C | C | A | Comparative |
| | 2 | B | C | C | C | A | Example |
| | 3 | B | C | C | C | A | JP-A No. 06- |
| | 4 | B | C | C | C | A | 228218 |
| | 5 | B | C | C | C | A | |
| Compound F | 1 | D | C | C | C | C | Comparative |
| | 2 | D | C | C | C | C | Example |
| | 3 | D | C | C | C | C | |
| | 4 | D | C | C | C | C | |
| | 5 | D | C | C | C | C | |
| Compound G | 1 | B | C | C | C | A | Comparative |
| | 2 | B | C | C | C | A | Example |
| | 3 | B | C | C | C | A | JP-A No. |
| | 4 | B | C | C | C | A | 2002-030024 |
| | 5 | B | C | C | C | A | |

Compound A

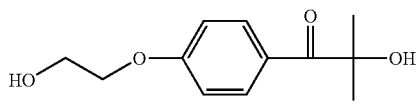

-continued

Compound B

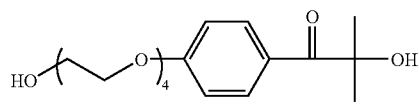

-continued

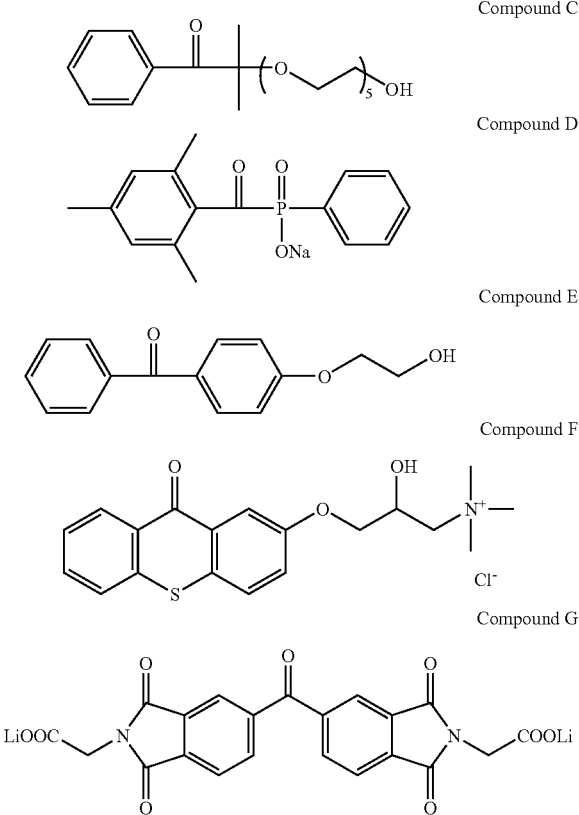

Compound C
Compound D
Compound E
Compound F
Compound G

Tables 2, 3, 4, and 5 show that excellent ink ejection properties and an image with no beading and with uniform glossiness, as well as excellent ink storage stability under fluorescent lighting can be realized employing the ink-jet ink of the present invention.

Example 2

An object of this example is to illustrate an ethylenically unsaturated group-containing compound suitable for the ink-jet ink of the present invention.

Using the black pigment dispersion (concentration: 10%) of Example 1, Black Inks, each of which has the composition shown in Table 6, were prepared. The materials shown in Table 6 are listed below.

A-400 (polyethyleneoxide diacrylate, molecular weight: ca. 500, produced by Shin-Nakamura Chemical Co., Ltd.)

A-900 (polyethyleneoxide diacrylate, molecular weight: ca. 1,000, produced by Shin-Nakamura Chemical Co., Ltd.)

A-Gly-9E (ethoxylated glycerin triacrylate, molecular weight: ca. 5,000, produced by Shin-Nakamura Chemical Co., Ltd.)

A-Gly-20E (ethoxylated glycerin triacrylate, molecular weight: ca. 10,000, produced by Shin-Nakamura Chemical Co., Ltd.)

Acryl group-containing polyvinyl alcohol (molecular weight: ca. 10,000, polymerization degree: 200, modification rate: 3%, and concentration: 10%)

Acryl group-containing polyvinyl alcohol (molecular weight: ca. 15,000, polymerization degree: 300, modification rate: 3%, and concentration: 10%)

Acryl group-containing polyvinyl alcohol (molecular weight: ca. 25,000, polymerization degree: 500, modification rate: 3%, and concentration: 10%)

UA-W2A (molecular weight: ca. 20,000, water-soluble urethane acrylate oligomer, produced by Shin-Nakamura Chemical Co., Ltd.)

EG: ethylene glycol
DEG: diethylene glycol
Olfin E1010 (produced by Nissin Chemical Industry Co., Ltd.)

Evaluation was carried out via the methods described in Example 1.

TABLE 6

| | Black Ink | | | | | | | | | | | | | |
|---|---|---|---|---|---|---|---|---|---|---|---|---|---|---|
| | No. 6 | No. 7 | No. 8 | No. 9 | No. 10 | No. 11 | No. 12 | No. 13 | No. 14 | No. 15 | No. 16 | No. 17 | No. 18 | No. 19 |
| Black Pigment Dispersion (concentration: 10%) | 30 | 30 | 30 | 30 | 30 | 30 | 30 | 30 | 30 | 30 | 30 | 30 | 30 | 30 |
| A-400(M.W.: ca.500) | 5 | | | | | | | | | | | 5 | | |
| A-900(M.W.: ca.1,000) | | 10 | 10 | 10 | | | | | | | | | | |
| A-Gly-9E(M.W.: ca.5,000) | | | | | 10 | | | | | | | | 3 | |
| A-Gly-20E(M.W. ca.10,000) | | | | | | 10 | | | | | | | | |
| **(P.D.: 200, M.R.: 3 mol %, concentration: 10%, M.W.: ca.10,000) | | | | | | | 40 | 40 | | | | | | |
| **(P.D.: 300, M.R.: 3 mol %, concentration: 10%, M.W.: ca.15,000) | | | | | | | | | 40 | | 40 | 40 | 40 | |
| UA-W2A(M.W.: ca.20,000) | | | | | | | | | | 8 | | | | |
| **(P.D.: 500, M.R.: 3 mol %, concentration: 10%, M.W.: ca.25,000) | | | | | | | | | | | 30 | | | |
| Photoinitiator 1) | 1.2 | 1.2 | | | 1.2 | 1.2 | 1.2 | | | 1.2 | 1.2 | | 0.6 | |
| Photoinitiator 16) | | 1.2 | | | | | | 1.2 | | | | 1.2 | | |
| Photoinitiator Compound A | | | 1.2 | | | | | | 1.2 | | | | 0.6 | 1.2 |
| Solvent | DEG 20 | DEG 30 | DEG 30 | DEG 30 | DEG 20 | DEG 20 | DEG 20 | DEG 20 | DEG 20 | DEG 20 | DEG 30 | DEG 20 | DEG 20 | DEG 20 |

TABLE 6-continued

| | Black Ink | | | | | | | | | | | | | |
|---|---|---|---|---|---|---|---|---|---|---|---|---|---|---|
| | No. 6 | No. 7 | No. 8 | No. 9 | No. 10 | No. 11 | No. 12 | No. 13 | No. 14 | No. 15 | No. 16 | No. 17 | No. 18 | No. 19 |
| Olfin E-1010 | 0.3 | 0.3 | 0.3 | 0.3 | 0.3 | 0.3 | 0.3 | 0.3 | 0.3 | 0.3 | 0.3 | 0.3 | 0.3 | 0.3 |
| Water | *1 | *1 | *1 | *1 | *1 | *1 | *1 | *1 | *1 | *1 | *1 | *1 | *1 | *1 |
| pH | 6.5 | 8.3 | 8.3 | 8.3 | 8.4 | 7.3 | 6.8 | 8.3 | 7.6 | 7.4 | 8.5 | 6.3 | 8.4 | 6.8 |
| Glossiness Uniformity | A | A | A | A | A | A | A | A | A | B | A | A | A | A |
| Beading under LED Lighting | B | B | B | C | A | A | A | A | C | A | A | A | A | C |

**Acryl Group-containing Polyvinyl Alcohol,
*1: the rest,
P.D.: polymerization degree
M.W.: molecular weight,
M.R.: modification rate Table 6 shows that, when the molecular weight of the ethylenically unsaturated group-containing compound used for the ink-jet ink of the present invention exceeds 6,000, beading prevention can be enhanced, and the employment of a polymer having an ethylenically unsaturated group-containing compound in its side chains can further enhance the beading prevention.

Example 3

Preparation of Ink Sets

Preparation of Yellow Pigment Dispersion, Magenta Pigment Dispersion, Cyan Pigment Dispersion, and Black Pigment Dispersion A yellow pigment dispersion, a magenta pigment dispersion, and a cyan pigment, each featuring a 10% concentration, were prepared in the same manner as in preparation of the black pigment dispersion of Example 1 except that, instead of carbon black, C.I. Pigment Yellow 128, C.I. Pigment Red 122, and C.I. Pigment Blue 15:3 were each used. Using the thus-prepared yellow, magenta, and cyan pigment dispersions, as well as the black pigment dispersion, ink samples were prepared, each of which had the same composition as Black Ink 2 of Example 1.

Photoinitiators used are listed in Table 7. Further, Ink Sets 1-5 shown in Table 7 were prepared using each of the ink samples.

[Image Formation and Image Evaluation]

With regard to each of the ink sets having been prepared above, each image of the individual colors was formed in the same manner as described in Example 1, and then in addition to evaluation of ink storage stability under fluorescent lighting as described in Example 1, evaluation of bleeding resistance of the formed images was conducted.

(Evaluation of Bleeding Resistance)

Each of the magenta fine line images was visually observed and the bleeding resistance was evaluated based on the following criteria.

A: The boundary line between the fine line and the non-image portion was clear.

B: Slight bleeding was observed in the boundary portion but the resultant quality fell within the limit of commercial viability.

C: Bleeding was clearly observed in the boundary portion and the line width was increased 1.5 times, resulting in problematic quality for commercial viability.

TABLE 7

| | | | Bleeding Resistance | | Storage Properties | |
|---|---|---|---|---|---|---|
| | Ink Color | Photoinitiator | High Pressure Mercury Lamp | LED | under Fluorescent Lighting | Remarks |
| Ink Set 1 | Yellow | Compound A | | | A | Comparative |
| | Magenta | Compound A | C | C | A | |
| | Cyan | Compound A | | | A | |
| | Black | Compound A | | | A | |
| Ink Set 2 | Yellow | Compound A | | | A | Comparative |
| | Magenta | Compound A | A | A | A | |
| | Cyan | 1) | | | A | |
| | Black | 1) | | | A | |
| Ink Set 3 | Yellow | 1) | | | A | Present Invention |
| | Magenta | 1) | A | A | A | |
| | Cyan | 1) | | | A | |
| | Black | 1) | | | A | |
| Ink Set 4 | Yellow | 24) | | | A | Present Invention |
| | Magenta | 24) | A | A | A | |
| | Cyan | 24) | | | A | |
| | Black | 24) | | | A | |
| Ink Set 5 | Yellow | Compound D | | | C | Comparative |
| | Magenta | Compound D | A | A | C | |
| | Cyan | Compound D | | | C | |
| | Black | Compound D | | | C | |

Table 7 shows that, when image formation is conducted using the ink sets employing the ink-jet ink of the present invention, excellent ink ejection properties can be realized and an image with no beading and with uniform glossiness can be formed, and further ink storage properties under fluorescent lighting can be enhanced. Further, it is more effective to employ the ink-jet ink of the present invention for black and cyan inks.

What is claimed is:

1. An ink-jet ink comprising at least water, a water-soluble solvent, a radically polymerizable compound, and a photoinitiator,
    wherein the photoinitiator is a compound represented by the following Formula (1) attached with a —X—Y group:

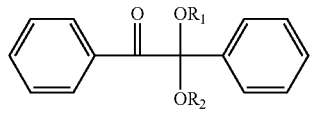

Formula (1)

wherein at least one of the two benzene rings incorporates at least one —X—Y group, and may further incorporate a halogen atom, an alkyl group, an alkoxy group, or an alkylthio group; in the —X—Y group, X is O or S; and Y is an alkylene-Z in which Z is a carboxylate, a sulfonate, a phosphate, or a quaternary ammonium salt; and $R_1$ and $R_2$ are each a substituted or an unsubstituted alkyl group.

2. The ink-jet ink described in claim 1,
wherein the radically polymerizable compound is an ethylenically unsaturated group-containing compound.

3. The ink-jet ink described in claim 1,
wherein the photoinitiator is a compound represented by Formula (A), (B), or (C):

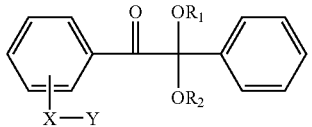

Formula (A)

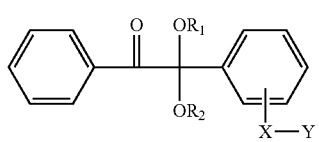

Formula (B)

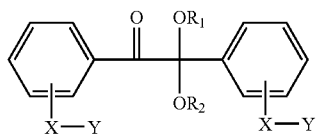

Formula (C)

wherein the —X—Y group, $R_1$, and $R_2$ as set forth in claim 1, and the two benzene rings may further incorporate a halogen atom, an alkyl group, an alkoxy group, or an alkylthio group.

4. The ink-jet ink described in claim 2,
wherein at least one of the ethylenically unsaturated group-containing compounds exhibits a weight average molecular weight of at least 6,000.

5. The ink-jet ink described in claim 2,
wherein at least one of the ethylenically unsaturated group-containing compound is a polymeric compound, and a hydrophilic main chain of the polymeric compound incorporates a plurality of side chains exhibiting the ethylenically unsaturated groups.

6. The ink-jet ink described in claim 1, having a pH of 5.5 or higher.

7. The ink-jet ink described in claim 1,
wherein the ink-jet ink contains a pigment.

8. The ink-jet ink described in claim 6, further containing a carbon black pigment.

9. An ink-jet recording method comprising the steps of:
    (a) ejecting an ink-jet ink described in claim 1 onto a recording medium from an ink-jet head, and
    (b) irradiating ultraviolet rays onto the ejected ink-jet ink to form an image.

* * * * *